United States Patent [19]
Earle et al.

[11] Patent Number: 6,014,810
[45] Date of Patent: Jan. 18, 2000

[54] PORTABLE TUBING CUTTER

[75] Inventors: Kent L. Earle, Woodridge; Greg L. Lauriano, Plainfield, both of Ill.

[73] Assignee: Etcon Corporation, Burr Ridge, Ill.

[21] Appl. No.: 08/218,507

[22] Filed: Mar. 25, 1994

[51] Int. Cl.[7] .................................................. B23D 21/06
[52] U.S. Cl. .......................... 30/92; 30/92.5; 30/95; 30/101; 30/102
[58] Field of Search .................. 30/92, 92.5, 95–99, 30/101, 102, 388; 7/157

[56] References Cited

U.S. PATENT DOCUMENTS

| H45 | 4/1986 | Gilmore | 30/92 X |
|---|---|---|---|
| 3,449,992 | 6/1969 | Hanaway | 30/92 X |
| 4,349,928 | 9/1982 | Mlikotin | 7/157 |
| 4,753,008 | 6/1988 | Hawkins | 30/96 |
| 5,046,250 | 9/1991 | Huang | 30/92 |
| 5,070,616 | 12/1991 | Chen | 30/92 |
| 5,142,825 | 9/1992 | Floyd | 30/102 X |
| 5,315,759 | 5/1994 | Mashata | 30/102 X |

FOREIGN PATENT DOCUMENTS

998010  2/1983  U.S.S.R. .................................. 30/101

Primary Examiner—M. Rachuba
Attorney, Agent, or Firm—Banner & Witcoff, Ltd.

[57] ABSTRACT

A portable cutter for cutting materials such as conduit tubing made of metal or other semi-rigid material including a motor, a power source for the motor, a saw blade, gripping mechanism for gripping an object to be cut, mechanism for automatically connecting the power source to the motor for a cutting operation, and mechanism for automatically activating the gripping mechanism.

12 Claims, 7 Drawing Sheets

PORTABLE TUBING CUTTER

BACKGROUND OF THE INVENTION

FIELD OF THE INVENTION

The present invention relates to a portable saw for cutting conduit which comprises tubing made of metal or other semi-rigid material. While various sizes of such tubing may be cut, we will describe herein a preferred embodiment designed to cut conduit having a diameter of from ¼ inch to 1 inch. The portable saw of the present invention may be powered by a battery mounted in a housing comprising part of the saw assembly.

An important object of the present invention is to provide a saw which is sufficiently automatic that an operator can cut off sections of conduit using only one hand to operate the saw, allowing a second hand for holding or positioning the conduit as necessary. The portable saw of the present invention can be preliminarily set by an operator for a cutting operation, and thereafter the operator can hold the saw and operate it using only one hand.

Another important advantage is to provide an improved portable saw which grips the tubing to be cut in a firm manner by means of gripping jaws which form a part of the saw assembly thereby providing an improved quality of cut which requires little if any deburring of the cut length of conduit.

The foregoing and other objects and advantages of the invention will be apparent from the following description of a preferred embodiment thereof, taken in conjunction with the accompanying drawings.

Now, in order to acquaint those skilled in the art with the manner of making and using our invention, we shall describe, in conjunction with the accompanying drawings, a preferred embodiment of the invention.

Detailed Description of the Invention

Figure 1:
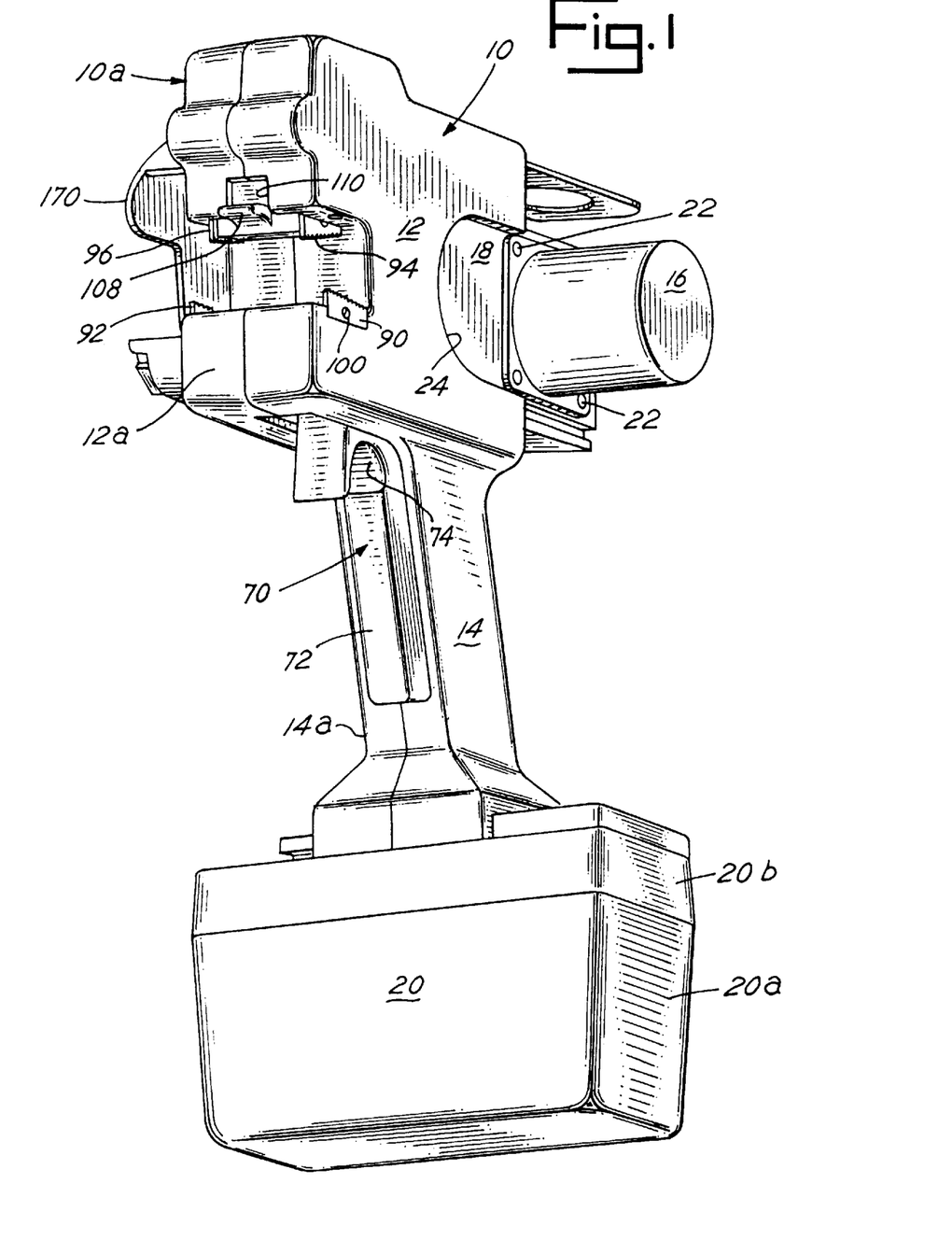
FIG. 1 is a perspective assembly view of a portable saw constructed in accordance with the present invention.

FIG. 1 shows a left half of a housing 10 including an upper housing portion 12 and a lower housing portion 14, a right half of a housing 10a including an upper housing portion 12a and a lower housing portion 14a. The two halves or sides of the housing 10 and 10a may be snapped or otherwise fixed together to house the various components of the portable saw.

A motor housing 16 contains a 4.5 volt DC motor for driving a saw blade. The motor housing 16 is bolted or otherwise affixed to a slidable carriage 18 which is movable forwardly and rearwardly within the housing 10, 10a as will be more fully described hereinafter.

FIG. 1 further shows a battery housing 20 which is carried at the lower end of the housing 14, 14a for housing a battery which is the preferred means for driving the motor contained within the motor housing 16. The battery housing 20 includes a base 20a and a cover 20b.

Figure 2:
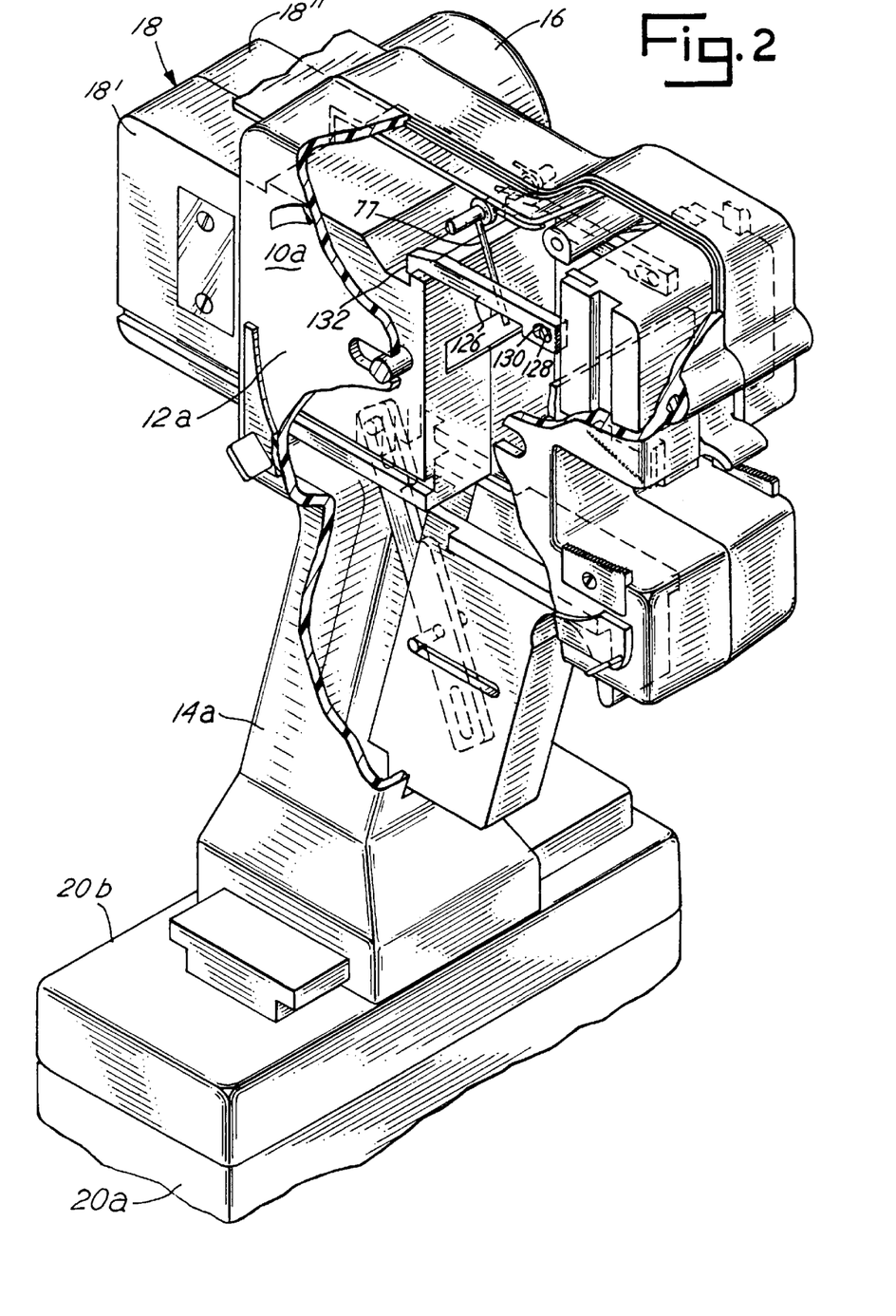
FIG. 2 is an enlarged perspective view of the portable saw of the present invention with a portion of one side of the housing broken away to illustrate internal components and with a movable carriage member being shown in an extreme rearward, left-hand position.
Figure 3:
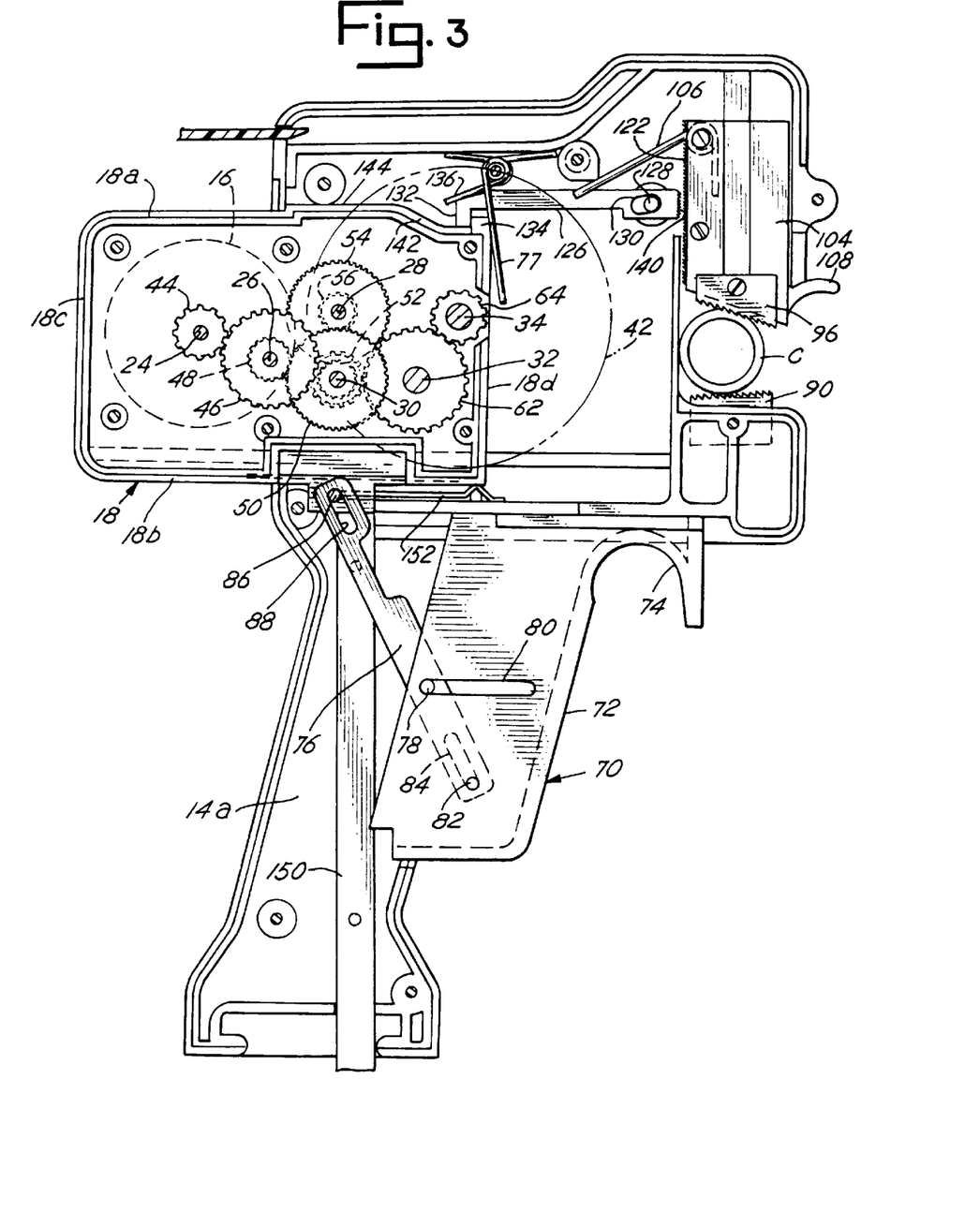
FIG. 3 is a side elevational view looking into the left half of the saw assembly and showing the carriage in its extreme rearward, left-hand position, there being shown a piece of conduit positioned between upper and lower jaws of the assembly with the upper jaw pressed down only by a spring force in the position illustrated.
Figure 4:
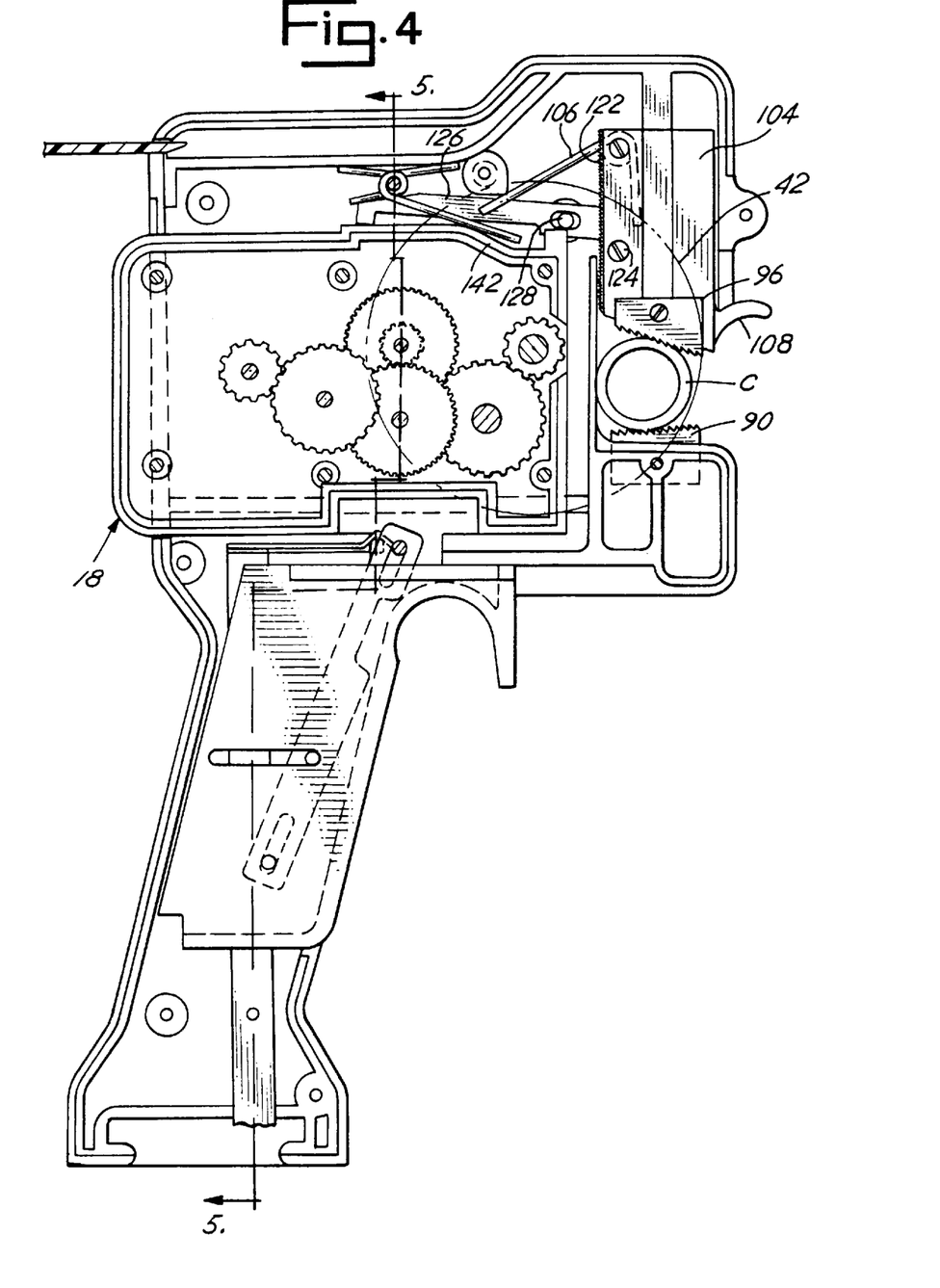
FIG. 4 is a side elevational view similar to FIG. 3 but showing the carriage in its extreme forward or right-hand position thereby causing the saw blade to be moved forwardly and also causing the upper jaws to be pressed down firmly to supply a substational gripping force to a length of conduit to be cut.

Reference is now made to the carriage 18 as shown in FIGS. 2–4. The rear end of the carriage 18 projects out rearwardly from the upper housing 10, 10a and it is horizontally slidable forwardly and rearwardly within the housing. The carriage 18 is formed of two half sections as shown at 18' and 18" in FIG. 2, and those half sections are joined in any suitable manner. FIGS. 2 and 3 show the carriage 18 in its rearward position prior to a cutting operation, and FIG. 4 shows the carriage in its forward position at the completion of a cutting operation.

FIG. 1 shows the manner in which the motor housing 16 may be attached to the left side of the carriage 18 by fastening members 22. The figure also shows a cut-out portion 24 in the side 10 of the upper housing to provide room for the motor housing 16 when the carriage 18 is moved to its forward position as shown in FIG. 4.

Figure 6:
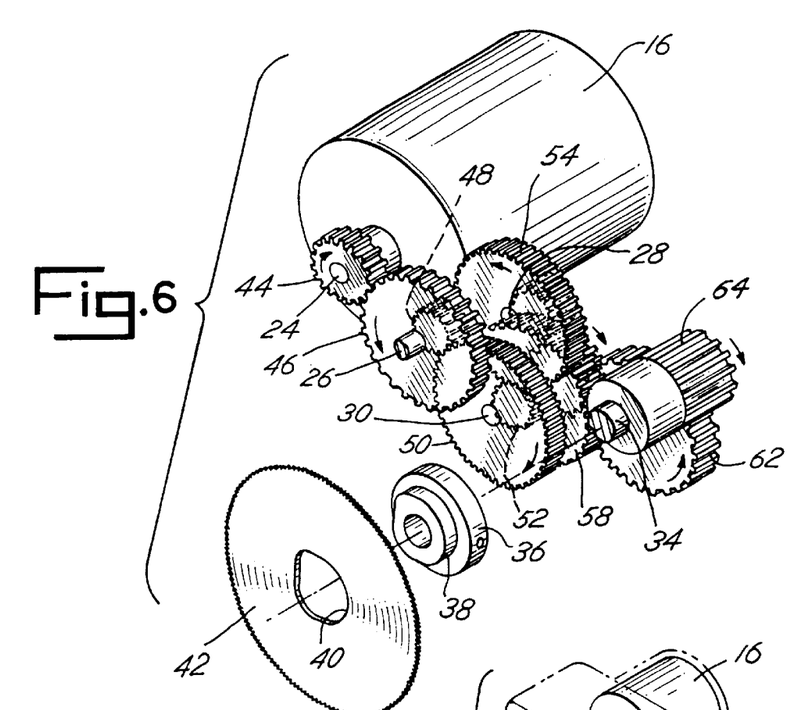
FIG. 6 is a partly exploded perspective view showing a motor housing, a motor shaft, a saw blade drive shaft and four additional gear shafts intermediate the motor shaft and saw blade shaft to effect driving of the saw blade from the motor shaft.

FIG. 3 shows the carriage 18 as comprising a top wall 18a, a bottom wall 18b, a rearward wall 18c and a forward wall 18d. FIG. 3 further shows six different gear shafts which are journalled in the carriage 18 comprising a motor drive shaft 24, gear shafts 26, 28, 30 and 32, and a blade shaft 34. FIG. 6 shows a disc member 36 which fixedly mounts on the blade shaft 34. The member 36 has an integral mandrel 38 having an oblong external shape which matches the shape of an opening 40 formed in the central portion of a saw blade 42. Thus, rotation of saw blade shaft 34 causes rotation of the saw blade 42.

Reference is now made to the gear train shown in FIGS. 3–6. Motor shaft 24 carries a gear 44 which is rotated in a clockwise direction as shown in FIGS. 3 and 6 by the motor shaft 24. A gear 46 on shaft 26 meshes with the gear 44 and is driven in a counter-clockwise direction as shown in FIGS. 3 and 6. Gear 46 is twice the diameter of gear 44 so it is rotated at one-half the rpm of gear 44. Shaft 26 also carries a small gear 48 which rotates with gear 46 and meshes with gear 50 on shaft 30 (see FIG. 6). Because gear 50 is three times the diameter of gear 48, the rpm of gear 50 will again be slowed by a 3 to 1 ratio compared to the rpm of gear 48.

Figure 5:
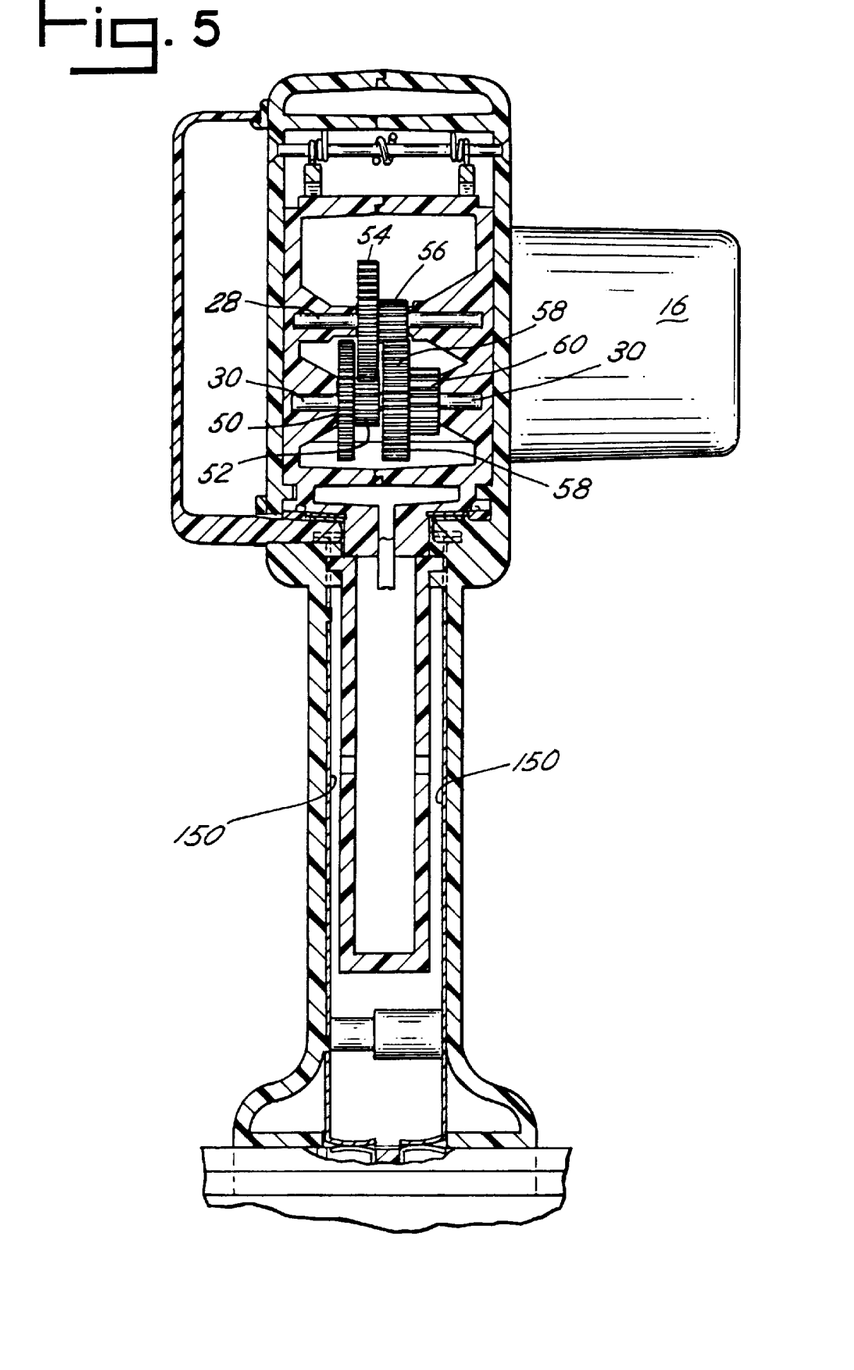
FIG. 5 is a vertical section taken along the line 5—5 of FIG. 4.

A small gear 52 is also mounted on shaft 30 (see FIG. 5) for rotation with gear 50, and gear 52 meshes with gear 54 on shaft 28 which in turn drives gear 56. Gear 56 meshes with larger gear 58 (see FIG. 5) and gear 60 is mounted on the same shaft 30 and rotates with gear 58. Gear 60 on shaft 30 (see FIG. 5) meshes with idler gear 62 which in turn drives gear 64 on blade shaft 34. Gear 60 and gear 64 are the same diameter, with the result that they rotate at the same rpm so that gear 62 functions as an idler gear. Gear 60 on shaft 30 as shown in FIG. 5 is hidden from view in FIG. 3.

The various gears described above are dimensioned so that in the particular embodiment being described there is a 54 to 1 ratio between the relatively high rpm of the motor shaft 24 with respect to the rpm of the blade shaft 34 which in this embodiment is driven at approximately 250 rpm.

A manually operable trigger 70 is provided for causing the carriage 18 to slide within the housing 12, 12a. As shown in FIGS. 1 and 3, the trigger 70 includes a body portion 72 having an arcuate recess 74 formed at the upper end to accommodate the forefinger of an operator. The upper end of the trigger 70 is supported from the lower end of housing 12, 12a and is slidable forwardly and rearwardly relative thereto. FIG. 3 shows the trigger 70 in its right-hand or forward position with the carriage 18 in its left-hand or rearward position. When the trigger 70 is pulled rearwardly by the finger of an operator, the carriage 18 is caused to move forwardly or to the right as shown in FIG. 3.

Figure 8:
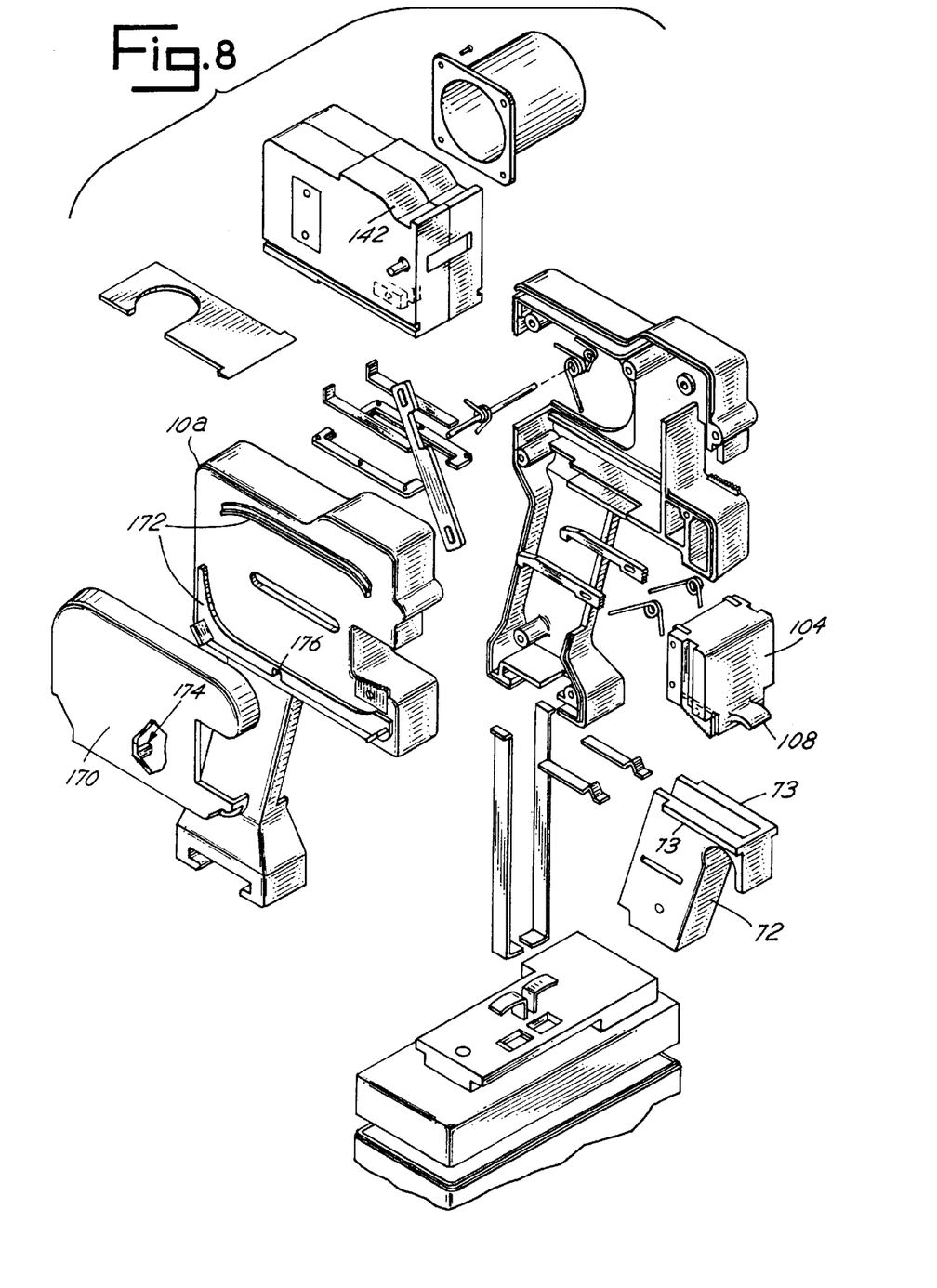
FIG. 8 is an exploded perspective view of the various components of the saw assembly.

The trigger body 72 includes a pair of opposed parallel rails 73 as shown in FIG. 8. The opposed rails 73 fit in guide slots at the lower sides of the main housing 12, 12a so that the trigger 70 is supported by the housing and is slidable forwardly and rearwardly relative thereto. Because the carriage 18 is biased rearwardly by a carriage spring as shown at 77 in FIG. 2, the trigger 70 is biased to its forward position through its interconnection with the carriage 18. While the spring shown at 77 in FIG. 2 biases the carriage 18 to its rear position as shown in that figure, the spring force is easily overcome by an operator pulling the trigger rearvardly using a forefinger thereby forcing the carriage to its forward position.

A trigger bar 76 interconnects the trigger 70 with the carriage 18 as shown in FIGS. 2–4. A pin 78 passes through a horizontal slot 80 in the trigger 72, and it also passes through a hole in the trigger bar 76 and through a hole (see 81 in FIG. 2) in the lower housing 14, 14a. A second pin 82 passes through a hole in the lower end of trigger 70 and through a slot 84 formed in the lower end of the trigger bar 76. In addition, a third pin 86 passes through a slot 88 at the upper end of trigger bar 76 and also extends into an opening (see 87 in FIG. 2) in the lower end of the carriage 18 so that pin 86 is fixed relative to carriage 18.

When the trigger 70 is pulled rearwardly or to the left as shown in FIG. 3, pin 82 is moved rearwardly to pivot trigger bar 76 about fixed pin 78 thereby causing pin 86 which is fixed to housing 12, 12a to move forwardly thereby advancing the carriage 18 forwardly. When the trigger 70 is moved to its extreme rearward position as shown in FIG. 4, the carriage 18 will be advanced to its extreme forward position as there shown. As will be explained hereinafter, when the carriage 18 has been moved to the forward position shown in FIG. 4, a cutting operation will have been completed. Thus, an operator can carry out a cutting operation with one hand by holding the portable cutter in that hand and pulling rearwardly on the trigger 70.

We will now describe a set of jaws for holding a length of conduit or the like to be cut. Referring first to FIG. 1, there are provided two fixed lower jaws 90 and 92 and two vertically movable upper jaws 94 and 96. The lower jaw 90 is fixed to the side 12 of the housing by a fastener 100 and the opposite jaw 92 is fixed to the opposite side wall of housing 12a in a similar manner so that both lower jaws are fixed relative to the housing 12, 12a. FIGS. 2 and 4 also illustrate the lower jaws 90 and 92, and as best shown in FIG. 4, the line of upwardly directed jaw teeth is inclined somewhat from the horizontal.

FIG. 8 shows an upper jaw body 104, and as shown in FIG. 4, the upper jaw body is mounted in the forward portion of upper housing 12, 12a for vertical sliding movement between a raised open position and a lower gripping position. The jaw body 104 is biased downwardly by a pair of jaw springs 106 (see FIGS. 3 and 4). Also the jaw body includes a forward projection 108 which readily permits an operator to manually raise the upper jaw body to an open position. The forward wall of the housing 12, 12a includes a slot 110 to accommodate the projection 108 as best shown in FIG. 1.

FIGS. 3 and 4 show a length of conduit or tubing C positioned between the upper and lower jaws so as to be gripped for purposes of a cutting operation. As will be explained more fully hereinafter, in the position shown in FIG. 3 the carriage 18 is rearwardly so that the upper jaw body 104 is urged downwardly only by the relatively low force created by the jaw springs 106. In contrast, FIG. 4 shows the carriage 18 in its forward position, and in the latter carriage position the upper jaw body 104 is forced downwardly by a pawl and rack mechanism to exert a strong gripping force on a length of conduit to be cut.

As shown in FIGS. 1 and 2, the two lower jaws 90 and 92 are spaced apart further than the upper jaws 94 and 96. As a result, when the upper jaw is forced downwardly to grip a length of conduit C, the conduit will be held in a stable manner by the four jaws which are laterally spaced from one another along the length of the conduit. Also, as best shown in FIGS. 3 and 4, the downwardly projecting teeth on the upper jaws 94 and 96 form a line which is angled to the horizontal.

FIG. 3 illustrates the purpose in the orientation of the upper and lower jaws. The saw blade 42 will be rotated in a clockwise direction as shown in FIG. 3. In addition, as the carriage 18 is moved forwardly or to the right as shown in FIG. 3 during a cutting operation, the blade 42 will be moved to the right with the carriage into engagement with a length of conduit C gripped in the jaw members. It will be seen that the incline from the horizontal of both the upper and lower jaws will resist any forward force exerted on the conduit by the blade 42. In addition, the saw blade which rotates in a clockwise direction as shown in FIG. 3 will tend to rotate the conduit C in a counterclockwise direction, and the saw teeth are angled to resist any such rotation of the conduit C.

We will now describe the manner in which the upper jaws are activated to grip a length of conduit during a cutting operation. FIGS. 3 and 4 show a vertical metal rack 122 fixed to one side of the jaw body 104 by screw members 124. The rack has a vertical line of rearwardly projecting teeth which cooperate with forwardly projecting teeth on the forward or right-hand ends of a pawl 126. A second rack is mounted to the opposite side of jaw body 104. Each pawl 126 is mounted at its forward end by means of a pin 128 which passes through a generally horizontal slot 130 in the pawl. As a result, the right-hand end of the pawl 126 is supported, and the pawl is capable of forward and rearward sliding movement due to the slot 130.

Still referring to FIGS. 3 and 4, the left-hand or rearward end of each pawl 126 includes a depending end 132 which in the position of FIG. 3 projects down behind an upwardly projecting shoulder 134 on the upper right-hand corner of carriage 18. Thus, when the carriage 18 is in its extreme rearward position as shown in FIG. 3, the shoulder 134 on the carriage 18 pulls rearwardly on the depending end 132 of the pawl 126 thereby pulling the pawl 126 to its rearward or left-hand position as shown in FIG. 3. Each pawl 126 is biased to the right or forwardly by a pawl spring 136.

The spring 136 as shown in FIG. 3 tends to bias the pawl 126 toward the rack 122 and also to bias the rear or depending end 132 of the pawl downwardly. However, when the carriage 18 is in the rearward position shown in FIG. 3, the shoulder 134 on the carriage will move the depending pawl end 132 rearwardly thereby pulling the pawl rearwardly against the bias of the spring 136 to cause the pawl teeth 140 to separate from the rack teeth 122. However, as the carriage 18 begins to move to the right or forwardly as viewed in FIG. 3, the shoulder 134 will move to the right thereby permitting the pawl 126 to be moved to the right by pawl spring 136 thereby engaging the pawl teeth 140 with the rack teeth 122. The engaging surfaces of the pawl teeth 140 and the rack teeth 122 which resist opening of the cutter jaw 104 are essentially flat or generally horizontal as viewed in FIG. 3. As a result, because those engaging surfaces are essentially flat or horizontal as viewed in FIG. 3, it would take an extremely high force to open or raise the cutter jaw 104 in order to cam the pawl teeth away from the rack teeth.

It should be understood that the foregoing description applies to only one of the two sides of the assembly. Thus, there is a rack 122 mounted to each of the two sides of the cutter jaw 104, and there are two pawls 126 arranged in side-by-side relation with each pawl having pawl teeth on its forward end for cooperating with a corresponding one of the two racks 122. There are also two sides to the carriage 18, each having an upper contour for cooperating with a depending end 132 of a corresponding one of the two pawls 126. FIG. 8 is an exploded view which will aid in illustrating the two pawls 126 and related components.

As the carriage 18 moves to the right or forward from the position of FIG. 3, the pawl 126 will first move to the right as previously described so that the pawl teeth 140 will engage the rack teeth 122. As the carriage 18 continues to move forwardly, the depending rear end 132 of the pawl will ride up an inclined surface 142 on the top of the carriage until the end 132 reaches an upper horizontal plane 144 on the top of the carriage 18. As the pawl 126 rides up the sloping surface 142, the pawl 126 will be pivoted in a clockwise direction as viewed in FIG. 4 about the pin 128 thereby causing the pawl teeth 140 to act on the rack teeth 122 with which they are engaged to apply a strong downward force on the upper cutter jaw 104. In the foregoing manner, forward movement of the carriage 18 automatically actuates the pawls 126 to apply a downward force on the racks 122 to move the upper jaws 94 and 96 downwardly to firmly grip a length of conduit C as shown in FIG. 4.

As the depending pawl end 132 climbs up the slope 142 to the upper surface 144 on top of the carriage 18, the pawl teeth 140 will act downwardly on the rack teeth 122 and cause the upper cutter jaw 104 to move downwardly approximately $50/1000$ths of an inch which will cause some deformation of the plastic housing, but the resulting force of the upper jaws 94 and 96 against the conduit C will be about 60 pounds. The foregoing force is preferably perpendicular to the conduit C. As previously indicated, the upper and lower jaw teeth are oriented to resist any lateral or rotational movement of the conduit C by the cutting blade 42 during a cutting operation.

The fact that there are four laterally spaced jaws gripping the conduit C, two from above and two from below, permits holding the conduit perpendicular to the tool, and because the conduit is so tightly gripped and prevented from movement during a cutting operation, the quality of the cut is improved so that deburring of cut conduit will not normally be necessary.

Figure 7:
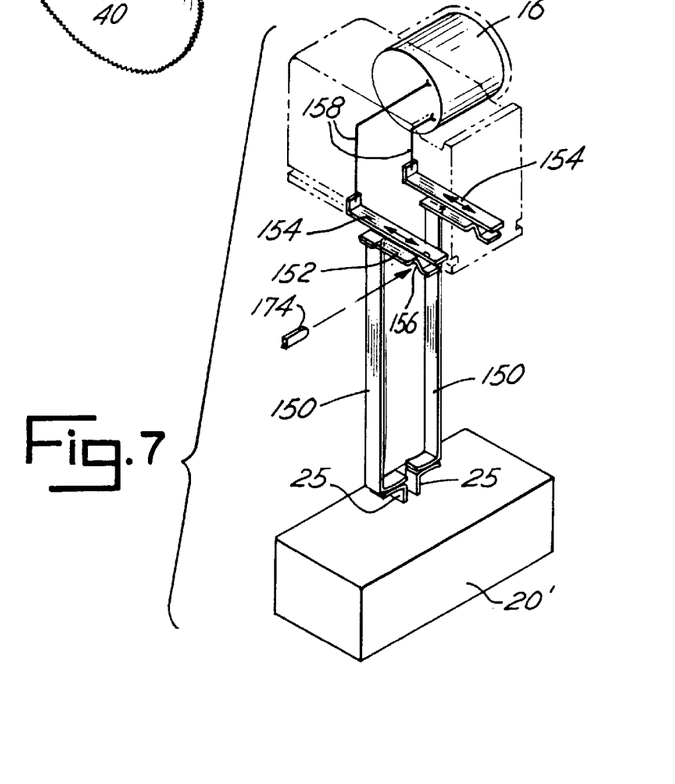
FIG. 7 is a schematic perspective view showing the manner in which a battery is connected to drive the saw blade motor but only when the movable carriage is in a selected forward position.

The manner in which the motor 16 is automatically started during forward movement of the carriage 18 will now be described. FIG. 7 is a schematic perspective view showing the motor 16 and a battery 20' which is housed within the battery housing 20. In accordance with the preferred embodiment being described, the battery 20' may be a 6 volt lead acid rechargeable battery. The battery 20' is connected to a pair of vertical phosphor bronze conductive strips 150 which extend up from the battery terminals 25 and connect to corresponding ones of a pair of horizontal conductive strips 152 which extend forwardly beneath the bottom wall of the carriage 18.

With reference to FIG. 3, the vertical conductive strips 150 extend upwardly through the handle or lower housing 14, 14a, and the connecting horizontal strips 152 are positioned above the bottom wall of the upper housing 12, 12a so as to lie beneath the carriage 18. In addition, the underside of the carriage 18 has attached thereto a pair of conductive strips 154 which are engageable with raised dimple portions 156 which extend upwardly from the horizontal conductive strips 152. When the components are in the position illustrated in FIG. 7, the battery terminals 25 are connected through conductive strips 150, 152 and 154 to leads 158 from the motor 16, such leads being connected to ends of the carriage strips 154.

The foregoing arrangement permits the motor 16 to be activated automatically when the carriage 18 is moved forwardly to a predetermined position. Thus, in the rearward position of the carriage 18 as shown in FIG. 3, the conductive strips 154 on the underside of the carriage will be positioned to the left of the upwardly projecting dimples 156 formed at the forward or right-hand ends of the conductive strips 152, so that the motor 16 will not be connected to the battery 20'. However, as the carriage 18 is moved forwardly to a predetermined position, the conductive strips 154 will move forwardly to the position shown in FIG. 7 so as to make contact with the dimples 156 thereby starting operation of the motor 16 and rotation of the saw blade 42. Thus, by the relative positioning of the fixed conductive strips 152 and the horizontally movable conductive strips 154, it is possible to control accurately the starting of the motor 16 at a desired forward carriage position so as to start motor 16 before the blade 42 engages the conduit C to be cut.

A safety feature is provided to prevent starting of the motor 16 unless a blade guard 170 is mounted over the saw blade 42. FIG. 8 shows the blade guard 170 together with blade guard latching strips 172 formed on the outside of the housing 10a. Thus, the blade guard 170 need only be pressed against the side of the housing 10a to attach the blade guard in a position where it will cover the saw blade 42 (see also FIG. 1). In addition, FIG. 8 shows an inwardly projecting finger 174 on the blade guard which projects inwardly through an opening 176 in the side of the housing 10a so as to raise up the adjacent conductive strip 152 (see FIG. 7) to a position where the dimple 156 will be engaged by the carriage conductive strip 154.

Thus, when the blade cover 170 is absent, the position of the conductive strip 152 is too low to be contacted by the carriage conductive strip 154. Of course, since there is no blade cover on the opposite side of the housing, the opposite conductive strip 152 may normally be positioned for engagement with the corresponding carriage conductive strip 154 when the carriage is moved forwardly.

The operation of the cutter will now be described. In order to initiate an operation to cut through a section of conduit C, the operator must first position the upper cutter jaw 104 in its raised position, and to do that the pawls 126 must be disengaged from the racks 122. The operator can manually move the trigger 70 a small amount forwardly or to the right as viewed in FIG. 3, and that will cause the carriage 18 to move to its fully rearward or left-hand position as shown in FIG. 3 thereby causing the projection 134 on the carriage to pull the pawls 126 to the left so as to disengage the pawl teeth from the racks 122. The carriage return spring 77 will of course aid in moving the carriage to its rearward position.

When the pawls 126 are thus disengaged from the racks 122, the operator may manually lift knob 108 to raise the upper cutter jaw 104 to its raised position by overcoming the spring force provided by the spring 106. Thereafter, by applying a slight rearward pressure on the trigger 70, the carriage 18 will be moved forwardly an amount sufficient to allow the pawl springs 136 to engage the pawls 126 with the rack teeth 122. In the foregoing manner, the upper cutter jaw 104 is locked in its raised, open position.

Having locked the jaw 104 in its open position, the operator may hold the cutter with one hand, leaving the other hand to pick up the conduit C and position it between the jaws as shown in FIG. 3. At this time, the operator may push the trigger 70 a slight amount forwardly which will again pull the pawls 126 out of engagement with the racks 122, thereby causing the cutter jaw springs 106 to bias the cutter jaw 104 downwardly. As a result of the foregoing operations, the cutter jaw 104 is spring loaded downward against the conduit C.

The cutting of the conduit C may now be completed by simply pulling further back on the trigger 70 until it has moved from the forward position of FIG. 3 to the rearward position of FIG. 4. As the trigger is moved rearwardly by a forefinger of the operator who may operate the saw using only one hand, the carriage 18 is moved from its rearward position of FIG. 3 to its forward position of FIG. 4. When the carriage 18 has moved forward to the point where the conductive strips 154 (see FIG. 7) on the underside of the carriage 18 have contacted the upwardly bent portion 156 on the fixed conductive strips 152, assuming the blade cover 170 is in place, the battery circuit to the motor 16 will be completed and the motor will automatically start to rotate the saw blade 42. The foregoing conductive strips are located so that the saw blade will be rotating before it reaches the conduit C to be cut. Continued pulling of the trigger 70 will move the carriage 18 to its fully forward position as shown in FIG. 4 where it can be seen that the saw blade 42 will have cut through the conduit C.

It is important to note that during the cutting operation, the forward movement of the carriage 18 will cause the rear ends of the pawls 126 to ride up the slope portion 142 on the top of the carriage and then the rear ends 132 of the pawls will ride along the horizontal surface 144 on top of the carriage ultimately reaching the position shown in FIG. 4. As previously explained, the foregoing causes the right-hand end of pawls 126 to force the racks 122 downwardly thereby lowering the cutter jaw body 104 by approximately $50/1000$ths of an inch to apply a significant gripping force to the conduit, e.g., a 60 pound force.

Relative to engagement of the pawl teeth 140 with the rack teeth 122, it is not possible to know the precise position of the rack at the time of such engagement. Accordingly, a limited amount of freedom of vertical movement of the ends of the pawl is provided for, e.g., 0.03 inch, to enable proper engagement of the pawl and rack teeth.

After completing a cutting operation as described above and the cut end has fallen off, the operator still has a free hand so at that point the operator can manually pull the carriage 18 back to its rearward position which will cause the motor circuit to be opened and will also disengage the pawls 126 from the racks 122 so the upper jaw body 104 will again be held down only by the force of springs 106. At that point, it is a simple matter to maneuver the saw so as to force the upper jaw body 104 upwardly to open the jaws. The return of the carriage 18 as described above can conveniently be accomplished by manually pulling back on the motor housing 16.

As stated above, by a simple twisting of the saw assembly relative to the remaining length of conduit, or by various other simple maneuvers, the upper jaw body 104 may be raised to an open position after the carriage 18 has been retracted. Thereafter, a slight pulling on the trigger 70 will engage the pawls 126 with the racks 122 thereby preparing the saw assembly for the next cutting operation.

What is claimed is:

1. A portable cutter for cutting conduit comprising, in combination, a housing, a carriage slidably mounted on said housing for sliding movement relative thereto, a saw blade rotatably supported on said carriage, a motor mounted on said carriage and operatively connected to said saw blade for rotating said saw blade, a battery supported by said housing and connected to said motor for supplying power to said motor, gripping members carried on said housing and movable between an open position and a closed position for firmly gripping an object to be cut, means for actuating said gripping members to closed position where they firmly grip said object to be cut, and a manually operable actuator carried by said housing and operatively connected with said carriage for moving said carriage from a retracted inoperative position to an advanced operative position where said saw blade is moved into cutting engagement with an object held by said gripping members.

2. A portable cutter as defined in claim 1 where said carriage is slidable toward and away from said gripping members and said gripping members are postitioned adjacent the path of said saw blade to hold said object to be cut in said path of said saw blade.

3. A portable cutter as defined in claim 1 where said motor is mounted on one side of said carriage.

4. A portable cutter as defined in claim 1 where said motor is connected to said saw blade by gear reducing means.

5. A portable cutter as defined in claim 1 including connecting circuit means associated with said carriage for connecting said battery to said motor, said connecting circuit means being open when said carriage is in said retracted position and being closed automatically through movement of said carriage toward said advanced position.

6. A portable cutter as defined in claim 1 where said means for actuating said gripping members are operatively connected to said carriage and are operable to close said gripping members when said carriage is moved toward said advanced position.

7. A portable cutter as defined in claim 1 where said manually operable actuator comprises a trigger member which is operable by one hand of an operator who is holding said cutter in said one hand.

8. A portable cutter for cutting metal conduit and other objects comprising, in combination, housing, a carriage slidably mounted on said housing for sliding movement relative thereto, a saw blade rotatably supported on said carriage, a motor mounted on said carriage and operatively connected to said saw blade by gear reducing means for rotating said saw blade, a battery supported by said housing and connecting to said motor for supplying power to said motor, connecting circuit means associated with said carriage for connecting said battery to said motor, said connecting circuit means being open when said carriage is in a retracted inoperative position and being closed automatically through movement of said carriage toward an advanced operative position, gripping members carried on said housing and movable between an open position and a closed position for firmly gripping an object to be cut, means for actuating said gripping members to closed positions where they firmly grip said object to be cut, said means for actuating being operatively connected to said carriage to close said gripping members when said carriage is moved toward said advanced position, and a manually operable trigger member carried by said housing and operatively associated with said carriage for moving said carriage from said retracted position to said advanced position whereby during movement of said carriage to said advanced position said gripping members are automatically closed, said battery is automatically connected to said motor, and said saw blade is moved into cutting engagement with said object held by said gripping members.

9. A portable cutter defined in claim 8 where said trigger member is interconnected with said carriage by a mechanical link so movement of said trigger member in a rearward direction will cause said carriage to be moved to said advanced operative position.

10. A portable cutter as defined in claim 8 where said gripping members comprised a pair of lower jaws fixed to said housing and a pair of upper jaws movable toward and away from said lower jaws.

11. A portable cutter as defined in claim 9 where said trigger member is interconnected with said carriage by a bar which is pivotally mounted to said housing and has one end connected to said trigger member and its opposite end connected to said carriage.

12. A portable cutter as defined in claim 8 where said means for actuating said gripping members includes cam means formed on a top surface of said carriage and means operable by said cam means to close said gripping members to firmly grip said object before said saw blade engages said object.

* * * * *